United States Patent [19]

Dukess

[11] 4,107,247

[45] Aug. 15, 1978

[54] METHOD OF CO-EXTRUSION WITH FOAM CORE

[76] Inventor: Joseph Dukess, 517 Fayette Ave., Mamaroneck, N.Y. 10543

[21] Appl. No.: 670,623

[22] Filed: Mar. 26, 1976

Related U.S. Application Data

[63] Continuation-in-part of Ser. No. 482,433, Jun. 24, 1974, abandoned.

[51] Int. Cl.² .............................................. B29D 27/00
[52] U.S. Cl. ................................... 264/45.9; 264/171; 264/DIG. 13; 428/71; 428/305; 428/315
[58] Field of Search ..................... 264/45.9, 46.1, 171, 264/172, 173, DIG. 13; 428/71, 305, 315

[56] References Cited

U.S. PATENT DOCUMENTS

| | | | |
|---|---|---|---|
| 3,029,476 | 4/1962 | Merck et al. ......................... | 264/46.1 |
| 3,331,900 | 7/1967 | Thomas ................................ | 264/46.1 |
| 3,524,795 | 8/1970 | Peterson ........................ | 264/171 X |
| 3,559,239 | 2/1971 | Work et al. ....................... | 264/171 X |
| 3,611,492 | 10/1971 | Scheibling ....................... | 264/172 X |
| 3,707,590 | 12/1972 | Wiggins et al. .................. | 264/173 X |
| 3,933,964 | 1/1976 | Brooks ................................. | 264/171 |
| 3,956,438 | 5/1976 | Schippers ........................ | 264/172 X |
| 4,053,341 | 10/1977 | Kleiner et al. .................. | 428/315 X |

FOREIGN PATENT DOCUMENTS

| | | | |
|---|---|---|---|
| 46-27,598 | 10/1971 | Japan ..................................... | 264/45.9 |

*Primary Examiner*—Philip Anderson
*Attorney, Agent, or Firm*—Kenneth S. Goldfarb

[57] ABSTRACT

This invention relates to a method for the manufacture of plastic sandwich element in which a first extruder is charged with essential ingredients for productions of foamed cellular plastic at a predetermined temperature. A second extruder is charged with essential ingredients for production of solid plastic at a temperature of at least 25 degrees farenheit from the predetermined temperature. The resulting sandwich is extruded through an extrusion die forming an integral plastic sandwich with the solid plastic layer controlling to a desired extent further foaming of the cellular plastic.

5 Claims, 5 Drawing Figures

U.S. Patent  Aug. 15, 1978  4,107,247
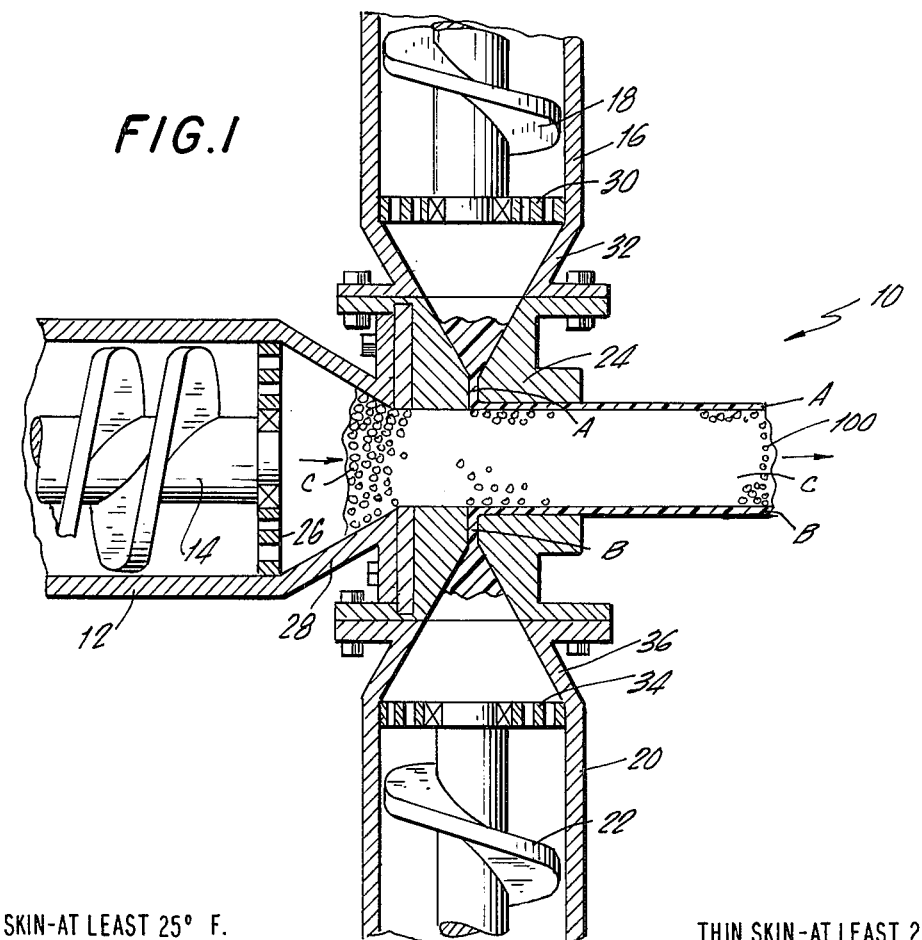
FIG.1
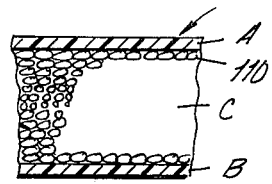
THICK SKIN-AT LEAST 25° F. HOTTER THAN CORE
FIG.2
FIG.2A
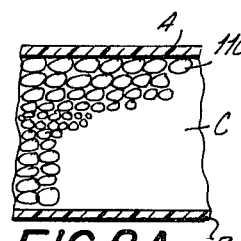
FIG.3
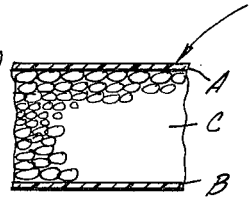
THIN SKIN-AT LEAST 25° F. HOTTER THAN CORE
FIG.3A
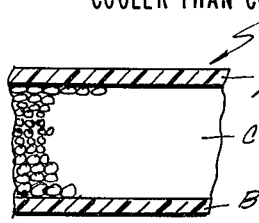
THICK SKIN-AT LEAST 25° F. COOLER THAN CORE
FIG.4
FIG.4A
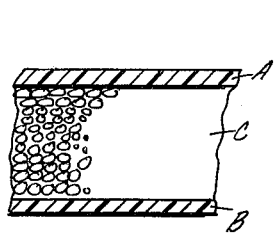
FIG.5
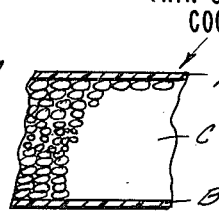
THIN SKIN-AT LEAST 25°F. COOLER THAN CORE
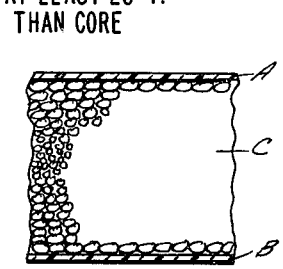
FIG.5A

METHOD OF CO-EXTRUSION WITH FOAM CORE

REFERENCE RELATED APPLICATION

This application is a continuation-in-part of the application of Joseph Dukess, Ser. No. 482,433, filed June 24, 1974 and now abandoned for METHOD OF LAMINATED EXTRUSION OF LAYERED PLASTIC WITH A FOAMED CORE.

BACKGROUND OF THE INVENTION

1. Field of the Invention

This invention relates to a method of manufacturing integrally formed plastic sandwiches. More particularly, the invention relates to a process for the extrusion of integral plastic members having solid skins and a cellular inner portion.

2. Description of the Prior Art

Attempts have been made in the past to provide for the production of plastic sandwich structural elements by bonding solid plastic skin members to the top and bottom surfaces of a cellular plastic core. However, this method of fabrication is costly since it requires the individual fabrication of the individual skin and core members, the application of a relatively costly adhesive material and the clamping of the bonded structural element until the adhesive is set. In addition, the difficulty in obtaining a high strength bond over an extended surface using an adhesive results in a product having a less than desirable level of reliability.

Other methods for the fabrication of plastic sandwich members have in the past included a molding process in which inert gas is dispersed in a polymer melt, the polymer melt is introduced into a mold and as the mold fills, the gas expands within the material forming a cellular core while a solid plastic skin forms along the walls of the mold. This method has the disadvantages of not permitting close control over the skin thickness, not permitting variations in material between the skin and the core and requiring a large and consequently expensive mold for the production of large plastic members.

Attempts have been made to co-extrude a multi-layer plastic sandwich such as disclosed in the patent to Chisholm et al, U.S. Pat. No. 3,557,265. This patent no where discloses the concept of providing a foamed core. In Thomas, U.S. Pat. No. 3,331,900 there is disclosed a skin coated foamed plastic article. Shippers, U.S. Pat. No. 3,782,870 disclosed an apparatus for partially foaming a portion of extruded material by separating melt streams and then rejoining the separate melt streams and partially foaming one of the melt streams.

SUMMARY OF THE INVENTION

The present invention contemplates control of the cellular core characteristics coextruding method utilizing the concept of temperature differences in the materials being co-extruded. According to the present invention, a first extruder is charged with essential ingredients for production of cellular plastic at a predetermined temperature. At least one second extruder is charged with essential ingredients for production of solid plastic at a temperature differing from said predetermined temperature by at least 25° F. Control means are provided for the simultaneous operation of the first and second extruders thus resulting in the extrusion of a sandwich member having a core of cellular plastic and one or more integrally formed skin members of solid plastic. The characteristics of the resulting plastic sandwich element can be controlled to feature, as desired, high felxural strength, hardness relatively high felxural rigidity, relatively low weight and relatively low cost. By increasing and decreasing the speed of operation of the second extruders, the thickness of skin members may be increased or decreased.

It is therefore an object of the present invention to provide a method for the manufacture of an integrally formed coextruded plastic member having a core of cellular plastic and skin members of solid plastic.

Another object of the present invention is to provide an apparatus for the manufacture of an integrally formed coextruded plastic member having a core of cellular plastic and skin members of solid plastic with the plastic member having top and bottom skins of a predetermined desired thickness so as to control the characteristics of the plastic sandwich.

Some of the advantages of the present invention is that the plastic sandwich material so produced is desirable for use as a cap liner. The product prevents product penetration in to the liner when used as a liner for caps, any product penetration stagnating behind the liner and attracting germs. The final product assures a smooth surface in contact with the contents of the product. The concept of temperature differential co-extrusion of the foam core provides for different degrees of resilience while also greatly providing for price advantage in that less material can be used. Further, the layers enable a better stamped liner allowing a sharp definition while providing for a stronger product. The layers encasing the foam core at a various temperature when co-extruded provide for a desired cell structure while in the event some cells blow too much and are open, the layers will seal these open cells thus forming a very resilient liner.

These, together with various ancillary objects of the present invention are obtained by this method of for manufacture of plastic sandwich elements, preferred embodiments being shown in the accompanying drawing by way of example only, wherein:

BRIEF DESCRIPTION OF THE DRAWING

FIG. 1 is a longitudinal sectional view through a portion of an embodiment of an apparatus which can be used according to the present invention;

FIG. 2 is a cross sectional view illustrating schematically the constuction of a co-extruded plastic sandwich with a retaining thick skin at a temperature of at least 25° F. hotter than the core shown immediately after co-extrusion;

FIG. 2A is a view similar to FIG. 2 after the core has additionally foamed;

FIGS. 3 and 3A are views similar to FIGS. 2 and 2A but illustrating the co-extruded plastic sandwich having a relatively thin skin coextruded at a temperature of at least 25° F. hotter than the core.

DETAILED DESCRIPTION OF THE INVENTION

With continuing reference to the accompanying drawing, wherein like reference numerals designate similar parts throughout the various views, reference numeral 10 is used to generally designate a typical apparatus which can be used for the co-extruding of the plastic sandwich.

As shown three extruders are employed arranged with the extruder 12 for the core being arranged horizontally and with its auger 14 fuding longitudinally. The extruders 16 and 20 and their augers 18 and 22 are shown arranged vertically. It is to be understood that while this is a space saving and convenient typical installation, in accordance with the concepts of the present invention the extruders can be disposed in any suitable arrangement such as side by side, angularly disposed, or even remote from each other, the material to be co-extruded being fed to a sizeably die 24.

In the illustrated embodiment, the first extruder 12 includes a perforated plate 26 and a tapered nozzle 29 through which core material C to be extruded is fed to the die 24. Likewise, skin material A feed by auger 18 passes through a perforated plate 30 and through tapered nozzle 32 onto the foamed core material C and thence through die 24. The skin material B feed by auger 22 passes through perforated plate 34 and tapered nozzle 36 onto the core material C and thence through die 24. This facilitates the formation of top skin A of solid plastic and a bottom skin B of solid plastic on the center core C of cellular plastic of the intergral plastic sandwich member 100. The extruder 12 is charged with essential ingredients for the production of cellular plastic and the second extruder 16 and the third extruder 20 are each charged with essential ingredients for the production of solid plastics.

Control means are provided to control the relative speeds of rotation of the augers 14, 18 and 22 to provide for delivery of selected and sufficient quantities of the essential ingredients to provide core material C and skin material A and B.

The present invention is adapted to use practically all thermoplastic materials. The thickness of the material may range from between 0.010 inches to an inch or two while the thickness of the skin material A and for B is in the order of 0.001 to 0.010 inches, the balance being in the thickness of core material C. A material for the integrally formed plastic sandwich element 100 may be polyethylene which forms A and B of solid polyethylene and a core C of closed cell foam polyethylene. The use of polyethylene is indicated by way of example, only and other thermoplastics materials having properties adapted for fabrication by an extrusion process and which can be formed in to a foam or cellular state may be utilized using the process and apparatus according to the present invention. Of course, two, three, or more layers may be used to obtain the desired thickness and properties where this material is used as a cap liner.

EXAMPLE 1

As shown in FIG. 2, a plastic 100 if formed with the core material C being formed from a mixture of melted polyethene, -a-powder substance such as zinc stearate in amounts as conventionally employed as a stabilizer and activator. A product solded by UniRoyal under the trade name of -Celogen-AZ-is employed as a foaming agent. Other conventional foaming agents may alternatively be employed. The extrusion temperature of the core material C may range from 300° to 400° F. at optimum operation and in this example the core material temperature selected is 300° F. The skin material A and B employed is delivered at a rate so that the thickness is 0.010 inches and is relatively thick. While the temperature of this polyethylene may range from 200° to 450° F.

The use of thick skin permits for reasonable tensile strength while the added heat of the skin will promote further expansion in a controlled manner of the cellular material C because of free release of pressure after passing through the die. The thick layer promotes eveness of the final sandwich even if the added heat will expand the resiliency of the material, allow for sufficient tensile stress and hardness while permitting expansion of the thickness of material in the order of 240% as compared to the thickness of an equal amount of material without foaming.

EXAMPLE 2

In FIGS. 3 and 3A there is shown an embodiment of the invention wherein a thin skin of a thickness of 0.001 inch is used at the same temperature as set forth in Example 1. This embodiment causes an expansion factor in the order of 600% with great resiliency, a shore hardness of 65 on a durometer and sufficient tensil stress to function well as a cap liner. The added heat of the skin unexpectedly enhances tensil strength rather than inhibits the tensil strength.

What is claimed is:

1. A method of manufacturing a coextruded article comprising the steps of mixing ingredients for a cellular plastic including a chemical blowing agent and a thermoplastic resin in a plastic state for forming a core and at a temperature ranging between 300° and 400° F. and with no cross linking agent, mixing other ingredients for at least one solid thermoplastic resin in a plastic state at a temperature differing from and hotter than said temperature by at least 25° F., for forming a skin for said core and then simultaneously coextruding said cellular plastic and solid plastic through a die so that said solid plastic at a temperature greater then said cellular plastic will promote foaming of said cellular plastic and increase the size of cells of cellular plastic adjacent said solid plastic.

2. A method of manufacturing a coextruded article according a claim 1, wherein said solid plastic is relatively thick in the order of 0.010 inch so that the enlargement of said core is maintained even.

3. A method of manufacturing a coextruded article according to claim 1, wherein said solid plastic is relatively thin on the order of 0.001 inch to permit for full expansion of said core while maintaining tensile strength.

4. A method of manufacturing according to claim 1, including the step of increasing the speed and amount of the solid plastic being extruded to increase the thickness of said skin.

5. A method of manufacturing according to claim 1, including the step of decreasing the speed and amount of the solid plastic being extruded to decrease the thickness of said skin.

* * * * *